(12) United States Patent
Juncker et al.

(10) Patent No.: US 6,536,854 B2
(45) Date of Patent: Mar. 25, 2003

(54) DRIVE WHEEL FOR TRACK APPARATUS

(75) Inventors: David L. Juncker, Mt. Vernon, IN (US); Glenn W. Kahle, Franklin, MO (US); Jamsheed Reshad, Newburgh, IN (US)

(73) Assignee: AgTracks, Inc., Mount Vernon, IN (US)

( * ) Notice: Subject to any disclaimer, the term of this patent is extended or adjusted under 35 U.S.C. 154(b) by 0 days.

(21) Appl. No.: 10/102,463

(22) Filed: Mar. 19, 2002

(65) Prior Publication Data

US 2002/0130552 A1 Sep. 19, 2002

Related U.S. Application Data

(63) Continuation-in-part of application No. 09/627,862, filed on Jul. 28, 2000.

(51) Int. Cl.[7] ................................................. B62D 55/12
(52) U.S. Cl. ........................ 305/195; 305/115; 305/199
(58) Field of Search .............................. 305/111, 115, 305/160, 178, 195, 199, 193, 194, 197, 198, 196

(56) References Cited

U.S. PATENT DOCUMENTS

| | | | | |
|---|---|---|---|---|
| 1,678,149 A | * | 7/1928 | Lamb | |
| 2,592,541 A | * | 4/1952 | Curtis | |
| 3,359,044 A | * | 12/1967 | Boggs | |
| 4,241,956 A | * | 12/1980 | Meisel, Jr. | |
| 4,469,379 A | * | 9/1984 | Kotyuk, Jr. | |
| 4,506,934 A | * | 3/1985 | Hammond | |
| 4,616,883 A | * | 10/1986 | Edwards et al. | ............... 305/40 |
| 5,005,921 A | * | 4/1991 | Edwards et al. | |

* cited by examiner

*Primary Examiner*—Russell D. Stormer
(74) *Attorney, Agent, or Firm*—Jansson, Shupe & Munger, Ltd

(57) ABSTRACT

A drive wheel engaged with flexible track of track apparatus mountable on a vehicle axle, the drive wheel including a peripheral portion which, between radially-extending drive members, has outwardly-facing lug-engagement surfaces in position for engagement with the distal surfaces of the track lugs, to extend the useful life of flexible track. Preferred embodiments have spaces facilitating removal of debris. Certain preferred lug-engaging surfaces are provided by peripherally-spaced cross-members. The drive wheel is preferably free of side structure, allowing track lugs to adjust precise positions of engagement with lug-engagement surfaces.

18 Claims, 9 Drawing Sheets

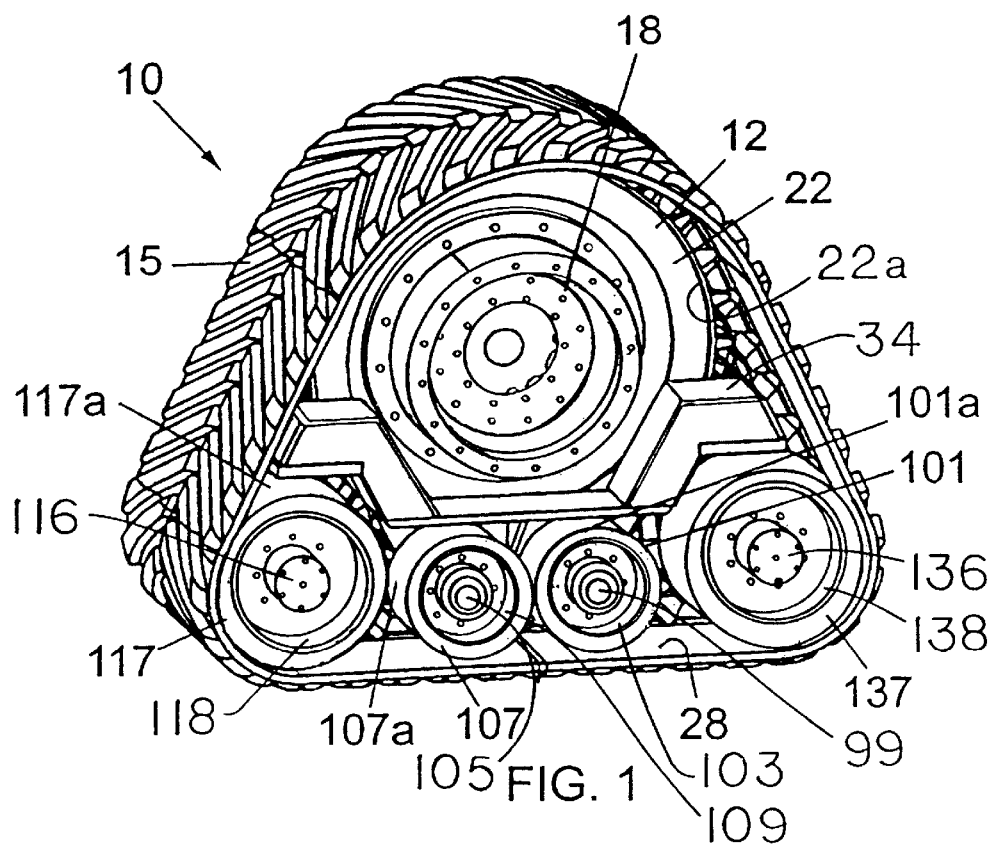
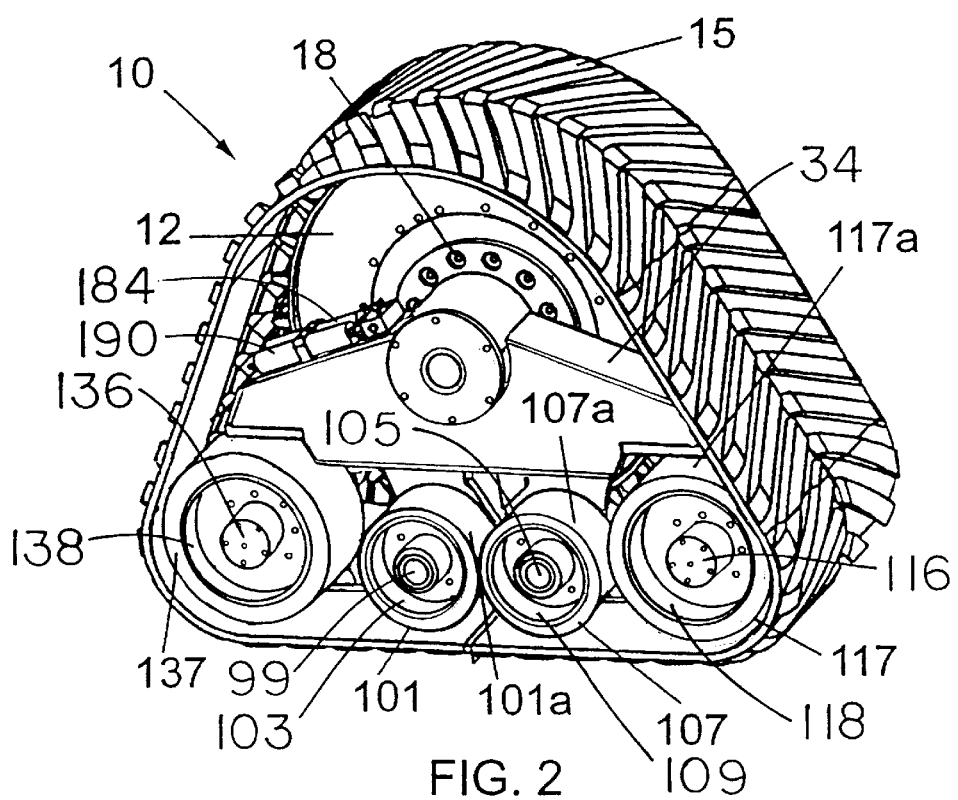

DRIVE WHEEL FOR TRACK APPARATUS

RELATED APPLICATION

This is a continuation-in-part of Ser. No. 09/627,862, filed Jul. 28, 2000.

FILED OF THE INVENTION

This invention relates generally to track apparatus for vehicles. In particular, this invention relates to track apparatus of the type for use in place of a vehicle wheel and, more particularly, to apparatus for driving the flexible tracks of such apparatus during vehicle operation.

BACKGROUND OF THE INVENTION

Agricultural vehicles such as tractors, combines and the like are commonly used in agricultural fields for a variety of jobs, and construction vehicles and other large work vehicles are used for many different jobs on a variety of ground surfaces. Typically, these vehicles have tires on which the vehicles are supported on the ground. These kinds of large vehicles are quite heavy, their weight of is distributed to a relatively small area by the vehicle the tires. As a result, the tires of such vehicles tend to compact the soil in the fields or other ground surfaces. Compacted soil discourages growth of crops planted in the fields which need loose soil to flourish, and ground surface compaction is often undesirable for other reasons as well.

In addition, since fields and other work sites are often wet due to rain or watering, vehicles which enter the fields become bogged down in the mud due to the fact that there is such a small tire area in contact with the ground. Therefore, it is highly desirable to develop a track apparatus for vehicles which disburses vehicle weight over a larger area so as to reduce the degree the ground compaction. Providing a larger ground-surface engagement area also serves to prevent vehicles from becoming bogged down in mud or other soft ground surfaces.

Prior track systems for vehicles are disclosed in U.S. Pat. No. Re 36,284 (Kelderman) and U.S. Pat. No. 5,829,848 (Kelderman), assigned to the assignee of the present invention and incorporated herein by reference. The Kelderman '284 reissue and '848 patents disclose track suspension systems for vehicles having a frame and a continuous rubber track. The drive wheel is attached to the frame for engaging and driving the continuous flexible track.

Each drive wheel of such prior apparatus has a plurality of drive projections disposed thereon which are between and engage corresponding rubber lugs extending from the inner surface of the flexible track. As the drive wheel rotates, the wheel projections engage the track lugs and drive the continuous flexible track. In such prior apparatus, the terminal surfaces of the track lugs do not engage the drive wheel; in other words, the track lugs are substantially unsupported. All of the driving force is imparted on the track lugs by the drive projections of the drive wheel, and this shear force, imparted as it is on substantially unsupported track lugs, tends to cause cracking and premature wear of the track lugs.

Certain prior art track apparatus, also of the type for use in place of a vehicle wheel, has a drive wheel which also includes side structure to retain the track lugs in engagement with the drive wheel—in an attempt to keep the track in proper alignment. In such prior apparatus, as with that described above, the terminal surfaces of the wheel lugs do not engage the drive wheel; in other words, the track lugs are substantially unsupported. Such drive wheels, as with those referenced above, impose shear forces on the track lugs, in the manner described above. However, when there is a tendency toward track misalignment, the side structure of the drive wheel engages the lateral surfaces of the track lugs, and imposes torsional and further shearing forces on such track lugs. These torsional and shearing forces exacerbate the resulting cracking and premature wear of the track lugs.

Consequently, it would be highly desirable to provide a drive wheel which does not damage the flexible track after extended use. Likewise, it would be highly desirable to provide a drive wheel which would minimize shearing forces on rubber track lugs and would minimize or eliminate the torsional forces described above.

OBJECTS OF THE INVENTION

It is an object of this invention to provide an improved track apparatus, of the type for use in place of a vehicle wheel, which overcomes some of the problems and shortcomings of the prior art, including those referred to above.

More particularly, it is an object of this invention to providing an improved drive wheel for engaging and driving the flexible track of track apparatus of the type for use in place of a vehicle wheel—namely, a drive wheel which overcomes the problems and shortcomings of the prior art referred to above.

Another object of this invention is to provide a track apparatus drive wheel which does not damage the flexible track during extended use.

Another object of this invention is to provide a track apparatus drive wheel which minimizes shearing forces on the lugs of flexible tracks used on such track apparatus.

Still another object of this invention is to provide a track apparatus drive wheel which minimizes or eliminates the torsional forces referred to above.

Yet another object of this invention is to provide a track apparatus drive wheel which effectively drives the flexible belt in difficult work conditions.

Another object of this invention to provide a track apparatus drive wheel which is simple and inexpensive to manufacture.

BRIEF SUMMARY OF THE INVENTION

In accordance with the present invention, an improved drive wheel for track apparatus of the type mountable on the rotatable axle of a vehicle is provided. The flexible track of such apparatus, when mounted, has upper and lower lengths, and the drive wheel drives the track by engagement with the upper length thereof. The track has an main inner surface and a plurality of spaced lugs projecting therefrom. The lugs each have leading and trailing surfaces and a pair of lateral surfaces, and each lug terminates in a distal end which is a generally flat surface spaced inwardly from the main inner surface of the track. This invention deals with the configuration of the drive wheel and its driving engagement with the flexible track, and the configurations and features of the invention overcome the above-noted shortcomings and problems.

The drive wheel of the invention includes: a central hub portion mountable on the axle for rotational movement therewith; a radially-extending portion terminating in a circumferential edge; and a peripheral portion affixed to the circumferential edge and having (1) radially-projecting drive members defining lug-receiving gaps therebetween and (2) outwardly-facing lug-engagement surfaces positioned for engagement with the distal surfaces of the track lugs. The engagement of the distal surfaces of the track lugs with the drive wheel during operation, i.e., the engagement of the distal track-lug surfaces with the outwardly-facing lug-engagement surfaces of the drive wheel when the track lugs are in the lug-receiving gaps, serves to overcome the above-mentioned problems of unacceptable cracking and premature wear of track lugs.

In certain preferred embodiments, the peripheral portion of the drive wheel includes an outer rim which forms the outwardly-facing lug-engaging surfaces. In such embodiments, it is preferred that the outer rim include a plurality of spaced openings therein. The outer rim can be in a variety of forms, including a continuous form interrupted only by the radial projections therefrom which form drive members that engage the trailing surfaces of the lugs.

In certain other highly preferred embodiments, the peripheral portion includes peripherally-spaced cross-members affixed to the circumferential edge of the radially-extending portion of the drive wheel, and such cross-members form the outwardly-facing lug-engaging surfaces.

It is highly preferred that certain of such embodiments include a rigidity ring which has an outward edge parallel to and spaced from the circumferential edge of the radially-extending portion and that the cross-members be affixed to the outward edge of the rigidity ring to span the space between the rigidity ring and the radially-extending portion of the drive wheel. The rigidity ring and the radially-extending portion form open spaces therebetween between adjacent pairs of the drive members to receive debris during operation.

In very highly preferred embodiments, the drive wheel is substantially free of side structure in positions which are both laterally adjacent to the lug-engagement surfaces between adjacent pairs of the drive members and radially beyond the circumferential edge of the radially-extending portion of the drive wheel. With such highly preferred feature, the track lugs are free to adjust their precise positions of engagement with the lug-engagement surfaces during operation. This serves to minimize or substantially eliminate the harmful torsional forces discussed above.

In certain preferred embodiments of this invention, the outward edge of the rigidity ring and the circumferential edge of the radially-extending portion are formed with alternating aligned pairs of extended portions and aligned pairs of recessed portions. Each of the radially-projecting drive members is welded to one of the aligned pairs of extended portions, and each of the cross-members is welded to one of the aligned pairs of recessed portions. This facilitates manufacture of the drive-wheel of this invention.

This invention also involves a track apparatus of the type mountable on a rotatable axle of a vehicle—e.g., in place of an ordinary wheel, such as a tractor drive wheel. The track apparatus of this invention includes the inventive drive wheels as set forth above.

BRIEF DESCRIPTION OF THE DRAWINGS

FIG. 1 is a rear isometric view of a track apparatus for a vehicle incorporating a drive wheel in accordance with the present invention.

FIG. 2 is a front isometric view of the track apparatus of FIG. 1.

DETAILED DESCRIPTIONS OF PREFERRED EMBODIMENTS

Figure 3:
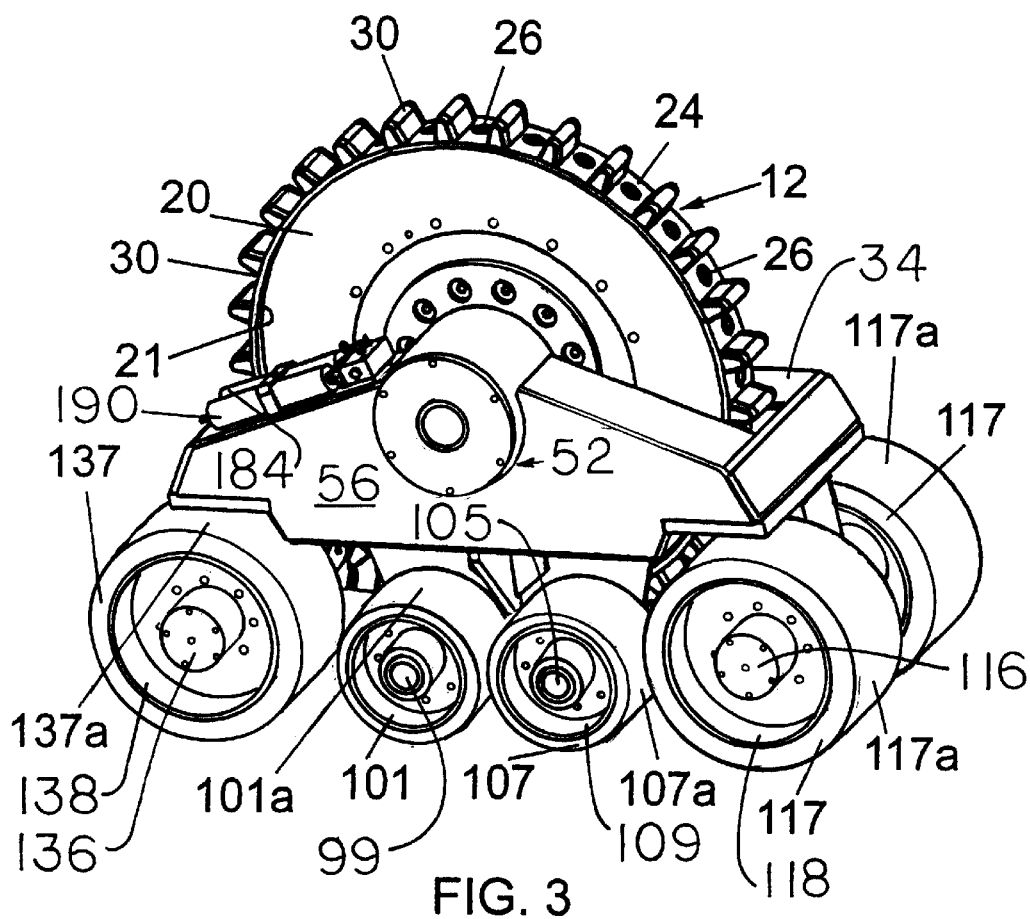
FIG. 3 is a front isometric view of the track apparatus of FIG. 1 with the flexible track removed.
Figure 4:
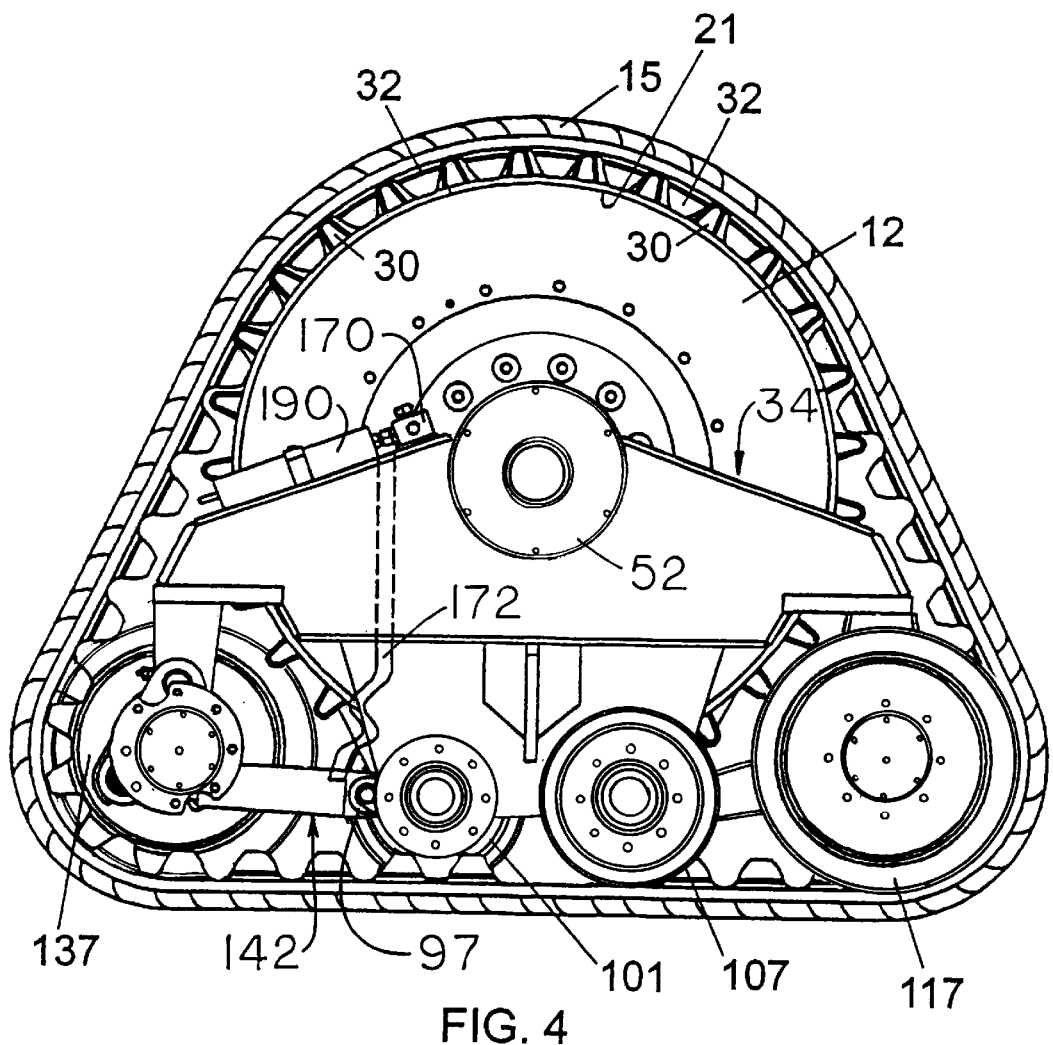
FIG. 4 is a front elevation of the track apparatus of FIG. 1.

Referring to FIGS. 1–2, a track apparatus in accordance with this invention is generally designated by the reference numeral 10. In a preferred embodiment, track apparatus 10 is mounted on an axle (not shown) of an agricultural vehicle (e.g., a tractor or a combine), a construction vehicle or other work vehicle. It is within the scope of the present invention for track apparatus 10 to be mounted on a wide variety of vehicles.

Track apparatus 10 includes a drive wheel 12 which is mountable to the axle of a vehicle for rotational movement therewith in order to drive a flexible track 15. As best seen in FIG. 1, in a preferred embodiment it is intended to mount track apparatus 10 to a vehicle having a planetary axle. However, it is contemplated to mount track apparatus 10 to a bar axle or other type of axle without deviating from the scope of the present invention.

Referring to FIG. 2, drive wheel 12 includes a first set of circumferentially spaced attachment openings 18 in the central hub portion of drive wheel 12. Openings 18 are aligned with corresponding openings formed in an attachment flange extending radially from the axle of the vehicle, as is conventional. Bolts extend through attachment openings 18 in drive wheel 12 and through corresponding openings in the attachment flange of the axle and are secured by corresponding nuts threaded on the ends thereof in order to interconnect the axle of the vehicle to drive wheel 12 so as to allow drive wheel 12 to rotate in unison with the axle of the vehicle.

As best seen in FIGS. 1–3, drive wheel 12 includes a radially-extending portion (or wall) 20, having inner and outer surfaces. Radially-extending portion 20 of drive wheel 12 terminates in a circumferential edge 21 (see FIGS. 3–5), where a peripheral portion of drive wheel 12 is affixed thereto. In the embodiment of FIGS. 1–6, the peripheral portion of drive wheel 12 includes an outer rim 23, which is affixed (welded) to circumferential edge 21. Spaced inwardly from radially-extending portion 20 and parallel thereto is a rigidity ring 22 which has an outward edge 22a which is parallel to and spaced from circumferential edge 21. Outer rim 23 is affixed (welded) to outward edge 22a, and rigidity ring 22 adds rigidity to wheel 12, including the peripheral portion thereof. Space between radially-extending portion 20 and rigidity ring 22 facilitates removal of accumulated debris (e.g., mud) from between drive wheel 12 and flexible track 15 during operation. Outer rim 24 of drive wheel 12 includes a plurality of circumferentially spaced openings 26 therein for allowing accumulated debris to pass therethrough.

Outer rim 24 includes an outer surface 29 having a plurality of circumferentially spaced drive members 30 projecting radially therefrom. As hereinafter described, radially-projecting drive members 30 are intended to engage corresponding track lugs 32 which project inwardly from the main inner surface 28 of flexible track 15 in order to drive flexible track 15.

In operation, track apparatus 10 is mounted to an axle of a vehicle through drive wheel 12 as heretofore described. The axle of the vehicle is rotated in a conventional manner through the vehicle by its engine and through a transmission which can vary the speeds and allow for forward and reverse rotation. Flexible track 15 of track apparatus 10 is positioned over drive wheel 12 such that track lugs 32 projecting from the inner surface 28 of flexible track 15 are received between corresponding pairs of drive members 30 projecting from outer surface 29 of outer rim 24 of drive wheel 12. As drive wheel 12 rotates, drive members 30 engage corresponding track lugs 32 and drive flexible track 15 about drive wheel 12. Thereafter, successive drive members 30 engage subsequent track lugs 32 extending from main inner surface 28 of flexible track 15 so as to drive flexible track 15 about drive wheel 12.

Figure 5:
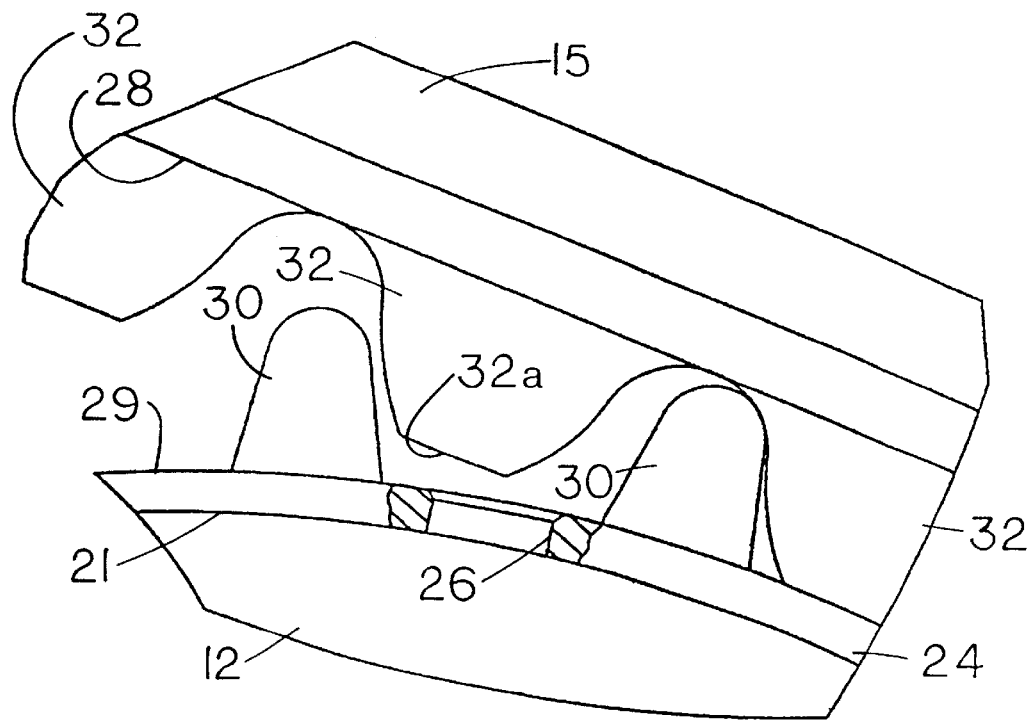
FIG. 5 is an enlarged fragmentary front elevation, partially in section, of a portion of the track apparatus of FIG. 1 showing engagement of the flexible track with the drive wheel.
Figure 6:
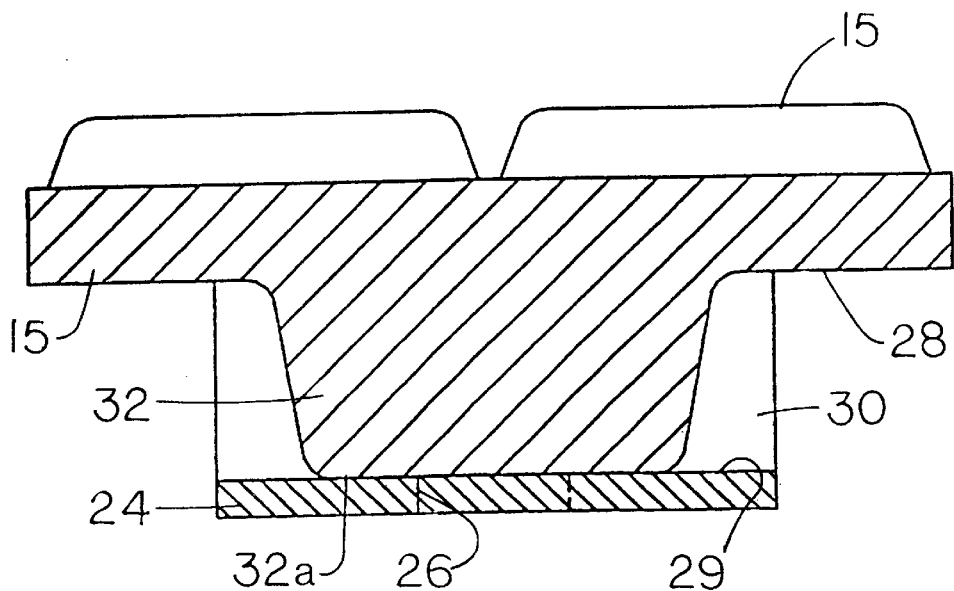
FIG. 6 is a cross-sectional view of a portion of the track apparatus of FIG. 1 showing engagement of the flexible track with the drive wheel.
Figure 7:
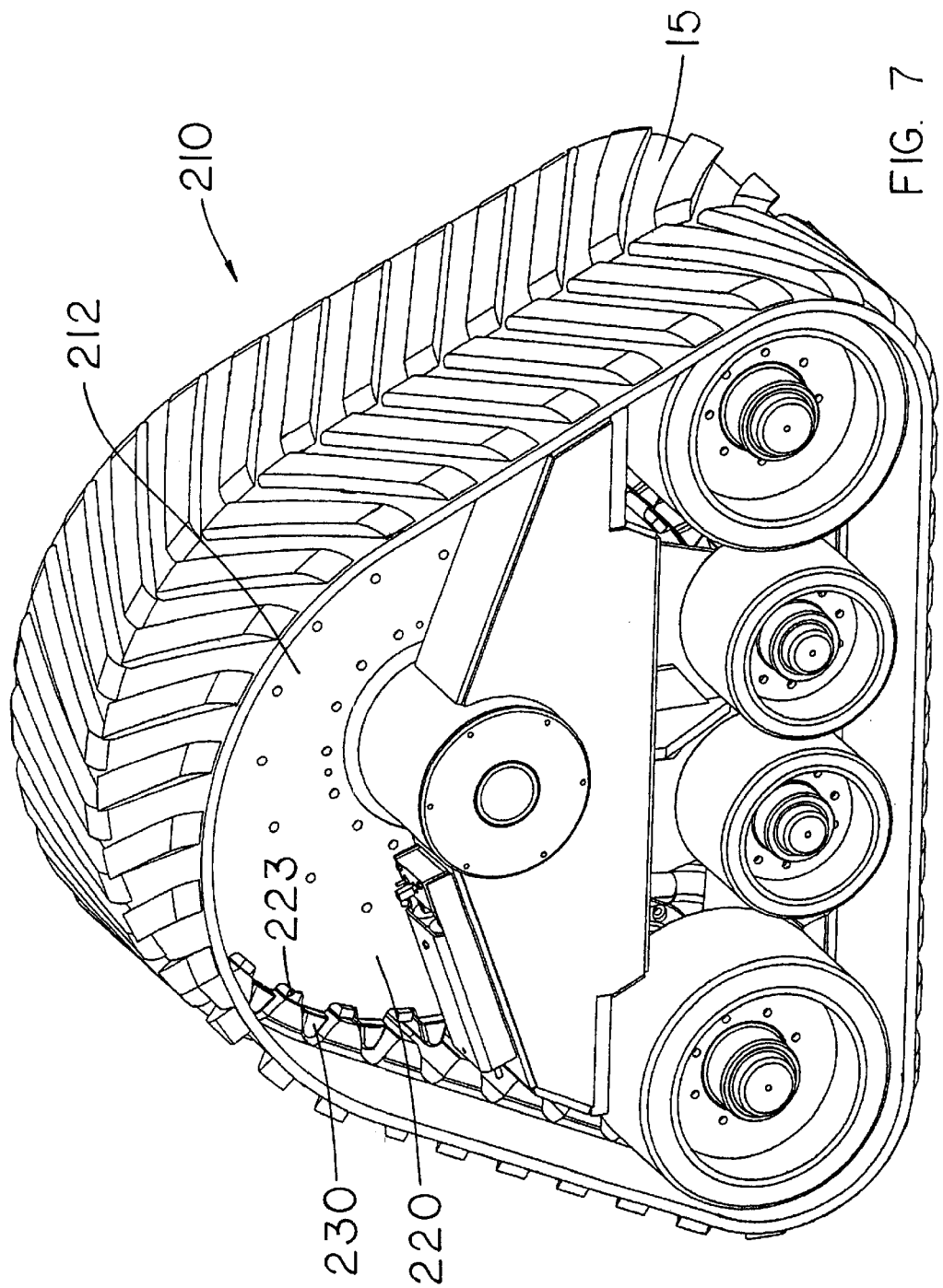
FIG. 7 is a front isometric view of a track apparatus showing another embodiment of this invention.
Figure 8:
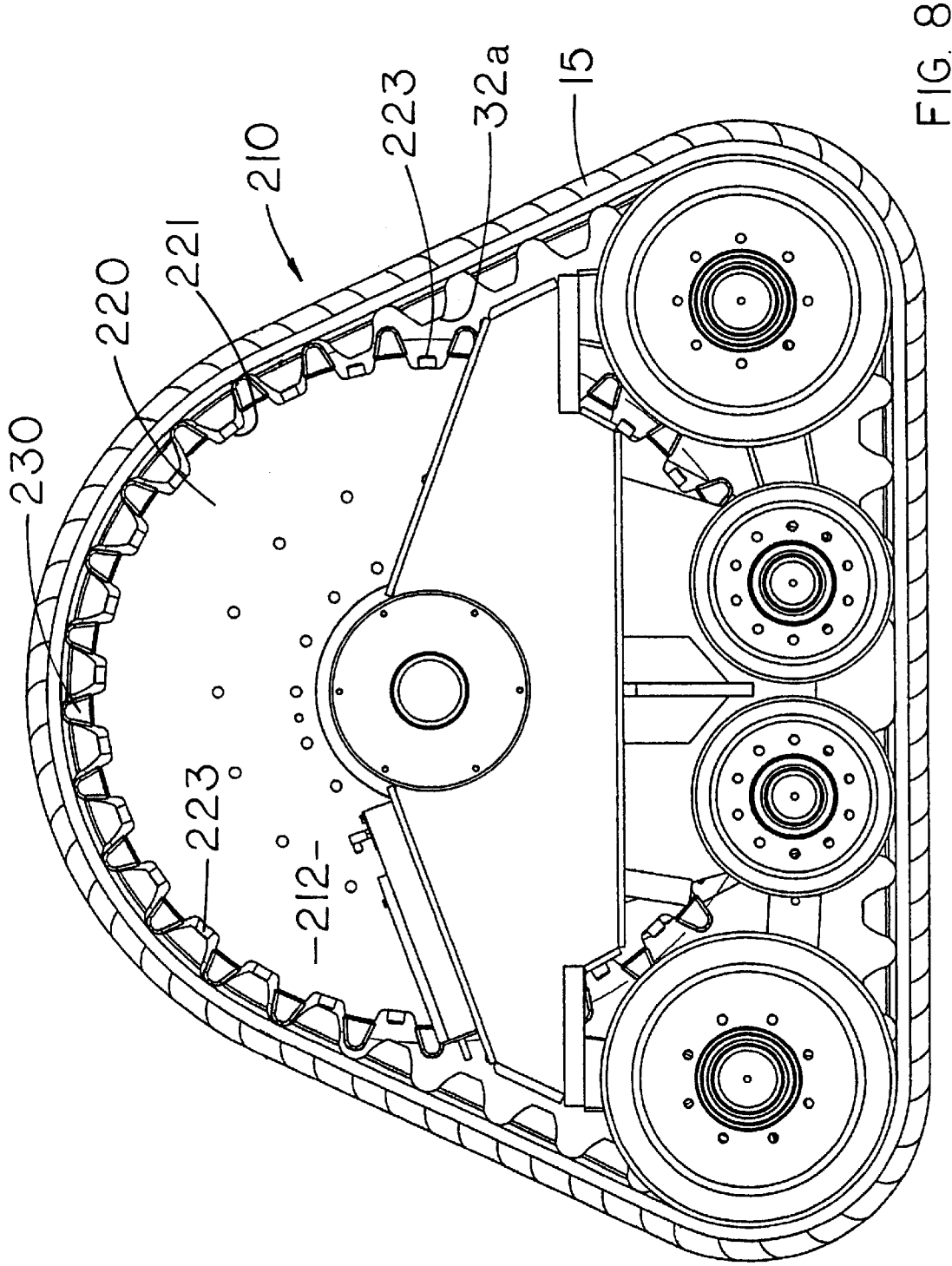
FIG. 8 is a front elevation of the track apparatus of FIG. 7.

As indicated above, and as shown best in FIGS. 5 and 6, the distal end surface 32a of track lugs 32 engages outer surface 29 of outer rim 24 of drive wheel in order that track lugs 32 are supported when driven by drive wheel 12. Such full engagement is seen in FIG. 6 and in the rightmost position of FIG. 5. Such full engagement, by which track 15 tends to function more like a driven belt and less like a driven chain, tends to minimize shearing forces on track lugs 32 and the possible twisting and turning of track lugs 32; hence, damage to track lugs 32 during operation of track apparatus 10 is significantly reduced, extending belt life.

Drive wheel 12 is free of side structure in positions which are both laterally adjacent to the lug-engagement surfaces that are between adjacent pairs of drive members 30 and radially beyond circumferential edge 21 of radially-extending portion 20 of drive wheel 12. As noted above, this tends to minimize or substantially eliminate the harmful torsional forces discussed above.

The following is a brief description of the engagement of flexible track 15 with other components of track apparatus 10: As flexible track 15 approaches leading idler wheels 137, track lugs 32 pass therebetween. In addition, the radially outer surfaces 137a of leading idler wheels 137 engage the inner surface 28 of flexible track 15 and direct the lower length of flexible track 15 into contact with a supporting surface such as a farmer's field. As flexible track 15 continues to be driven about drive wheel 12, track lugs 32 pass between the pairs of leading and trailing bogie wheels 101 and 107, respectively. The radially outer surfaces 101a and 107a of bogie wheels 101 and 107, respectively, engage the inner surface 28 of flexible track 15 along its lower length and insure contact of flexible track 15 with the supporting surface along the lower length of flexible track 15. Similarly, as flexible track 15 approaches trailing idler wheels 117, track lugs 32 on the inner surface 28 of flexible track 15 pass therebetween. The radially outer surfaces 117a of idler wheels 117 engage the inner surface 28 of flexible track 15 and guide flexible track 15 onto drive wheel 12 to form a continuous loop. If drive wheel 12 is rotated in the opposite direction, trailing idler wheels 117 may function as leading idler wheels and leading idler wheels 137 may function as trailing idler wheels, all as known in the art.

FIGS. 7–11 illustrate track apparatus 210 which is a particularly preferred embodiment of this invention, which differs from track apparatus 10 of FIGS. 1–6 only in that the peripheral portion of the drive wheel. The descriptions which follow will focus on differences in these two embodiments of this invention, by describing pertinent details of track apparatus 210.

Figure 10:
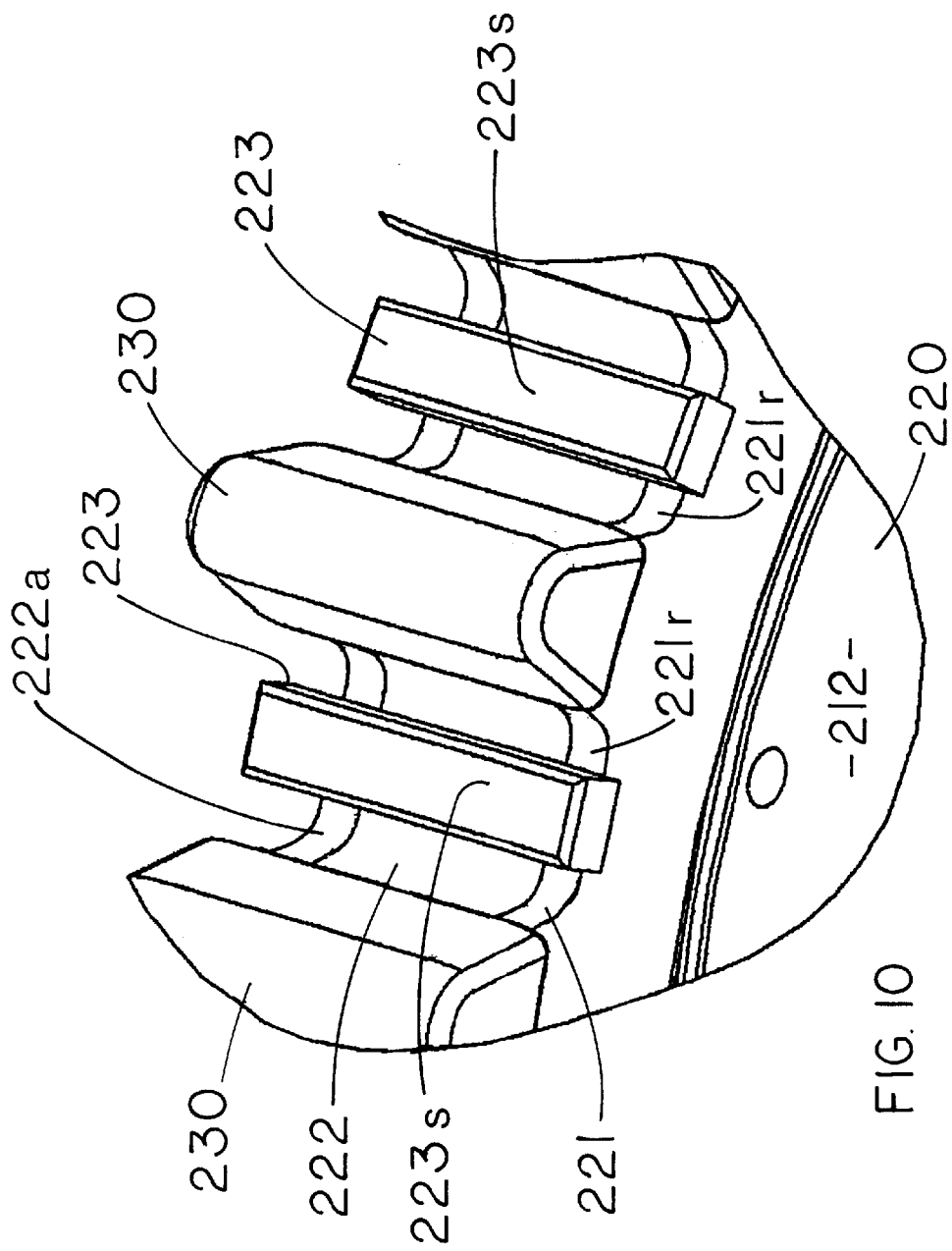
FIG. 10 is an enlarged fragmentary perspective view of the track apparatus of FIG. 7, showing details of the peripheral portion of the drive wheel.
Figure 11:
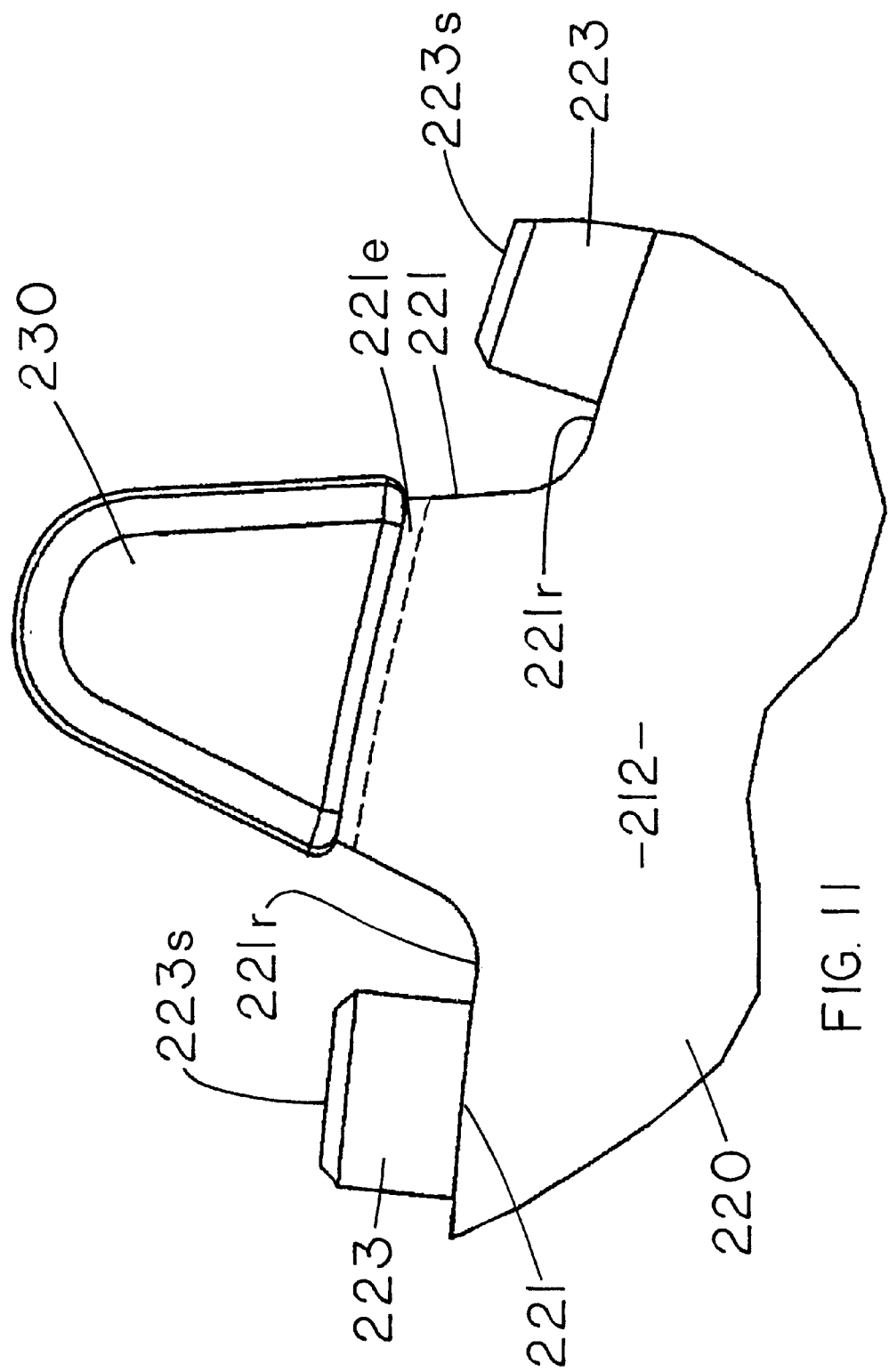
FIG 11 is a further enlarged fragmentary front elevation of FIG. 10.

Track apparatus 210 has a drive wheel 212 which includes a radially-extending portion (or wall) 220, having inner and outer surfaces. Radially-extending portion 220 terminates in a circumferential edge 221, where a peripheral portion of drive wheel 212 is affixed thereto. The peripheral portion of drive wheel 212 includes a plurality of peripherally-spaced cross-members 223 which are affixed (welded) to recessed portions 221r of circumferential edge 221, as best seen in FIGS. 10 and 11. Cross-members 223 form outwardly-facing lug-engaging surfaces 223s, which are positioned for engagement with distal ends 32a of track lugs 32, as shown best around the top portion of drive wheel 212 in FIG. 8.

Figure 9:
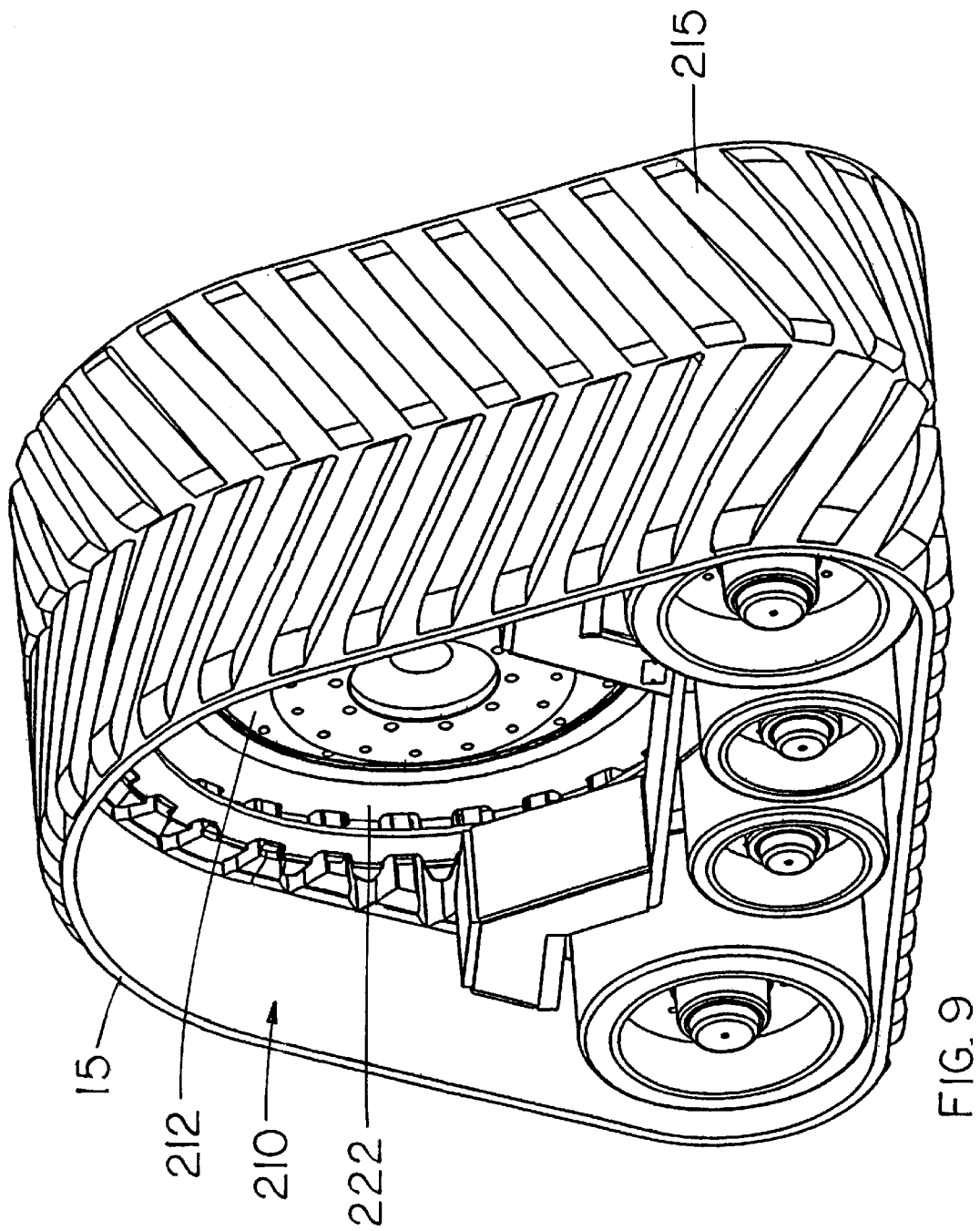
FIG. 9 is a rear isometric of the track apparatus of FIG. 7.

As shown best in FIGS. 9 and 10, spaced inwardly from radially-extending portion 220 and parallel thereto is a rigidity ring 222 which has an outward edge 222a which is parallel to and spaced from circumferential edge 221. Cross-members 223, in addition to being welded to recessed portions 221r of circumferential edge 221, are welded to corresponding recessed portions of rigidity ring 222. Cross-members 223 span the space between rigidity ring 222 and radially-extending portion 220, and such space facilitates removal of accumulated debris (e.g., mud) from between drive wheel 212 and flexible track 215 during operation. Cross-members 221, radially-extending portion 220 and rigidity ring 222 are positioned and dimensioned such that there are substantial open spaces for removal of mud and other debris. The substantial openness along the peripheral portion of drive wheel 212 is a significant advantage.

Circumferential edge 221, in addition to including recessed portions 221r, has intervening extended portions 221e (see FIG. 11), and outward edge 222a of rigidity ring 222 has a precisely parallel shape. In other words, outward edge 222a and circumferential edge 221 are formed with alternating aligned pairs of extended portions and aligned pairs of recessed portions. As can be seen, not only are cross-members 223 each affixed (welded) to a pair of corresponding recessed portions, but radially-projecting drive members 230 are each affixed (welded) to a pair of corresponding extended portions. As noted above, this facilitates manufacture of drive wheel 212.

As can be seen, drive wheel 212, like drive wheel 12, is free of side structure. That is, drive wheel 212 is free of side structure in positions which are both laterally adjacent to cross-members 223 (i.e., laterally adjacent, not circumferentially adjacent), at positions between adjacent pairs of drive members 230 and radially beyond circumferential edge 221 of radially-extending portion 220 of drive wheel 212. As already noted, this serves to minimize or substantially eliminate harmful torsional forces.

As with drive wheel 12, drive wheel 212 of track apparatus 210 fully engages distal end surface 32a of track lugs 32 in order that track lugs 32 are supported when driven by drive wheel 12. This full engagement of track 15 tends to minimize shearing forces on track lugs 32 and the possible twisting and turning of such lugs. Thus, damage to track lugs during operation of track apparatus 210 is reduced, significantly extending belt life.

While the principles of the invention have been shown and described in connection with specific embodiments, it is to be understood that such embodiments are by way of example and are not limiting.

What is claimed is:

1. A drive wheel engaged with a flexible track of a track apparatus, the drive wheel mountable on a vehicle axle, the flexible track having a main inner surface and spaced lugs projecting therefrom, each lug terminating in a distal surface spaced inwardly from the main inner surface, the drive wheel comprising:

a central hub portion mountable on the axle for rotational movement therewith;

a radially-extending portion terminating in a circumferential edge; and a peripheral portion affixed to the circumferential edge and having outwardly-facing lug-engagement surfaces positioned for engagement with the distal surfaces of the track lugs, the outwardly-facing lug-engagement surfaces being substantially planar.

2. The drive wheel of claim 1 wherein the peripheral portion includes an outer rim forming the outwardly-facing lug-engaging surfaces.

3. The drive wheel of claim 2 wherein the outer rim includes a plurality of spaced openings therein.

4. The drive wheel of claim 1 wherein the peripheral portion includes peripherally-spaced cross-members affixed to the circumferential edge and forming the outwardly-facing lug-engaging surfaces.

5. The drive wheel of claim 4 further including:

a rigidity ring having an outward edge parallel to and spaced from the circumferential edge of the radially-extending portion; and the cross-members being affixed to the outward edge of the rigidity ring to span the space between the rigidity ring and the radially-extending portion, and the rigidity ring and radially-extending portion forming open spaces therebetween to receive debris during operation.

6. The drive wheel of claim 1 wherein the drive wheel is substantially free of side structure in positions laterally adjacent to the lug-engagement surfaces and radially beyond the circumferential edge, whereby the track lugs are free to adjust their precise positions of engagement with the lug-engagement surfaces.

7. A drive wheel engaged with a flexible track of a track apparatus, the drive wheel being mountable on a vehicle axle, the flexible track having a main inner surface and spaced track lugs projecting therefrom, each lug terminating in a distal surface spaced inwardly from the main inner surface, the drive wheel comprising:

a central mounting portion mountable on the axle for rotational movement therewith;

a radially-extending portion terminating in a circumferential edge; and a peripheral portion affixed to the circumferential edge and having (a) radially-projecting drive members defining lug-receiving gaps therebetween and (b) outwardly-facing lug-engagement surfaces within the lug-receiving gaps in position for engagement with the distal surfaces of the track lugs, the drive wheel being substantially free of side structure in positions which are laterally adjacent to the lug-engagement surfaces between adjacent pairs of the drive members and radially beyond the circumferential edge, whereby the track lugs are free to adjust their precise positions of engagement with the lug-engagement surfaces.

8. The drive wheel of claim 7 wherein the peripheral portion includes an outer rim forming the outwardly-facing lug-engaging surfaces.

9. The drive wheel of claim 8 wherein the outer rim includes a plurality of spaced openings therein.

10. The drive wheel of claim 7 wherein the peripheral portion includes peripherally-spaced cross-members affixed to the circumferential edge and forming the outwardly-facing lug-engaging surfaces between adjacent pairs of the drive members.

11. The drive wheel of claim 10 further including:

a rigidity ring having an outward edge parallel to and spaced from the circumferential edge of the radially-extending portion; and the cross-members being affixed to the outward edge of the rigidity ring to span the space between the rigidity ring and the radially-extending portion, and the rigidity ring and radially-extending portion forming open spaces therebetween between adjacent pairs of the drive members to receive debris during operation.

12. The drive wheel of claim 11 wherein:

the outward edge of the rigidity ring and the circumferential edge of the radially-extending portion are formed with alternating aligned pairs of extended portions and aligned pairs of recessed portions;

each of the radially-projecting drive members is welded to one of the aligned pairs of extended portions; and each of the cross-members is welded to one of the aligned pairs of recessed portions, thereby facilitating drive-wheel manufacture.

13. A track apparatus mountable on a rotatable axle of a vehicle, comprising:

a continuous flexible track having a main inner surface and spaced lugs projecting therefrom, each lug terminating in a distal surface spaced inwardly from the main inner surface; and a drive wheel having (a) a central hub portion mountable on the axle for driving the flexible track about the axle, (b) a radially-extending portion terminating in a circumferential edge, and (c) a peripheral portion affixed to the circumferential edge and having ($c_1$) radially-projecting drive members defining lug-receiving gaps therebetween and ($c_2$) peripherally-spaced cross-members forming outwardly-facing lug-engagement surfaces within the lug-receiving gaps between adjacent pairs of the drive members in position for engagement with the distal surfaces of the track lugs.

14. The track apparatus of claim 13 wherein the peripheral portion includes an outer rim forming the outwardly-facing lug-engaging surfaces.

15. The track apparatus of claim 14 wherein the outer rim includes a plurality of spaced openings therein.

16. The track apparatus of claim 13 further including:

a rigidity ring having an outward edge parallel to and spaced from the circumferential edge of the radially-extending portion; and the cross-members being affixed to the outward edge of the rigidity ring to span the space between the rigidity ring and the radially-extending portion, and the rigidity ring and radially-extending portion forming open spaces therebetween between adjacent pairs of the drive members to receive debris during operation.

17. The track apparatus of claim 16:

the outward edge of the rigidity ring and the circumferential edge of the radially-extending portion are formed with alternating aligned pairs of extended portions and aligned pairs of recessed portions;

each of the radially-projecting drive members is welded to one of the aligned pairs of extended portions; and each of the cross-members is welded to one of the aligned pairs of recessed portions, thereby facilitating drive-wheel manufacture.

18. The track apparatus of claim 13 wherein the drive wheel is substantially free of side structure in positions which are laterally adjacent to the lug-engagement surfaces between adjacent pairs of the drive members and radially beyond the circumferential edge, whereby the track lugs are free to adjust their precise positions of engagement with the lug-engagement surfaces.

* * * * *

UNITED STATES PATENT AND TRADEMARK OFFICE
CERTIFICATE OF CORRECTION

PATENT NO.    : 6,536,854 B2
DATED         : March 25, 2003
INVENTOR(S)   : David L. Juncker et al.

It is certified that error appears in the above-identified patent and that said Letters Patent is hereby corrected as shown below:

Column 1,
Line 7, delete "FILED" and insert -- FIELD --.
Lines 23-24, after "heavy," delete "their weight of is distributed to a relatively small area by the vehicle the" and insert -- and their weight is distributed on a relatively small area by the vehicle --.

Signed and Sealed this

Seventh Day of October, 2003

JAMES E. ROGAN
*Director of the United States Patent and Trademark Office*